United States Patent [19]
Haimowitz et al.

[11] Patent Number: 5,960,430
[45] Date of Patent: Sep. 28, 1999

[54] GENERATING RULES FOR MATCHING NEW CUSTOMER RECORDS TO EXISTING CUSTOMER RECORDS IN A LARGE DATABASE

[75] Inventors: Ira Joseph Haimowitz, Niskayuna; Brian Terence Murren, Clifton Park; Henry Lander, Niskayuna; Barbara Ann Pierce, Slingerlands; Mary Clarkeson Phillips, Delmar, all of N.Y.

[73] Assignee: General Electric Company, Schenectady, N.Y.

[21] Appl. No.: 09/113,406

[22] Filed: Jul. 10, 1998

Related U.S. Application Data

[62] Division of application No. 08/702,379, Aug. 23, 1996.

[51] Int. Cl.$^6$ ................................................. G06F 17/30
[52] U.S. Cl. .......................... 707/6; 707/1; 707/2; 707/3; 707/5
[58] Field of Search ..................... 707/1, 2, 3, 6, 707/8, 7, 10, 100, 101, 104, 200, 201, 203, 511, 532, 533, 534, 536, 541, 102, 103, 204, 205; 704/7, 9; 706/45, 47, 50, 53, 52, 101; 364/274.7

[56] References Cited

U.S. PATENT DOCUMENTS

| | | | |
|---|---|---|---|
| 4,290,105 | 9/1981 | Cichelli et al. | 707/5 |
| 5,129,082 | 7/1992 | Tirfing et al. | 707/3 |
| 5,202,982 | 4/1993 | Gramlich et al. | 707/2 |
| 5,227,970 | 7/1993 | Harris | 707/1 |
| 5,303,149 | 4/1994 | Janigian | 707/6 |
| 5,446,888 | 8/1995 | Pyne | 707/10 |
| 5,479,654 | 12/1995 | Squibb | 707/201 |
| 5,481,704 | 1/1996 | Pellicano | 707/5 |
| 5,497,486 | 3/1996 | Stolfo et al. | 707/7 |
| 5,515,534 | 5/1996 | Chuah et al. | 707/101 |
| 5,583,778 | 12/1996 | Wind | 705/34 |
| 5,604,910 | 2/1997 | Kojima et al. | 707/3 |
| 5,619,709 | 4/1997 | Caid et al. | 707/532 |
| 5,706,497 | 1/1998 | Takahashi et al. | 707/5 |
| 5,724,593 | 3/1998 | Hargrave, III et al. | 704/7 |

OTHER PUBLICATIONS

"SSA–Name An Introduction", Search Software America, Old Greenwich, CT, Version 1.6, Oct. 1, 1994, pp. 1–24.

"The Field Matching Problem: Algorithms And Applications" By AE Monge, Et Al, Second International Conference On Knowledge Discovery And Data Mining, Aug. 2, 1996, AAA1 Press, Menlo Park, Ca, pp. 267–270.

"The Merge/Purge Problem for Large Databases" by MA Hernandez, et al, Proceedings of the ACM Sigmoid International Conference on Management of Data (May 1995), pp. 1–35.

*Primary Examiner*—Wayne Amsbury
*Assistant Examiner*—Srirama Channavajjala
*Attorney, Agent, or Firm*—David C. Goldman; Jill M. Breedlove

[57] ABSTRACT

A method and system for matching new customer records to existing customer records in a database. The new customer records are validated for quality and normalized into a standard form. A hash key is selected to generate a candidate set of records from the existing records in the database that likely matches the new customer records. The new customer records are then matched to each of the records in the candidate set. Once the matching has been performed, a decision is made on whether to create a new customer record, update an existing record, or save the new record in a pending file for resolution at a later time. In another embodiment, there is a methodology for learning matching rules for matching records in a database. The matching rules are then used for matching a new customer record to existing records in a database.

10 Claims, 6 Drawing Sheets

| Field No. | Field Name | Width | Description |
| --- | --- | --- | --- |
| 1 | Customer Name | 50 | Customer Name |
| 2 | Address Line 1 | 25 | 1st Address Line |
| 3 | Address Line 2 | 25 | 2nd Address Line |
| 4 | Address Line 3 | 25 | 3rd Address Line |
| 5 | Address Line 4 | 25 | 4th Address Line |
| 6 | Cotu | 25 | City Name |
| 7 | State or Province | 2 | US State or Canadian Province |
| 8 | Postal | 9 | Postal/Zip Code |
| 9 | Country Number | 3 | Standard ISO Country Code |
| 10 | Customer Phone Number | 15 | Phone Number of Customer |
| 11 | Duns Location Number | 9 | Unique Duns Number of Customer |
| 12 | Ultimate Duns Number | 9 | Duns Number of Parent Company |
| 13 | Ultimate Name | 50 | Name of Parent Company |
| 14 | VAT Number | 15 | Value-Added Tax Number of Customer |
| 15 | Federal Taxpayer ID | 9 | US Federal Taxpayer ID Number of Customer |
| 16 | Primary SiC Code | 4 | Standard Industry Code of Customer |

| Field | Record 1 | Record 2 |
|---|---|---|
| Match | 0 | 0 |
| Hash | 1US060 | 1US060 |
| Business | VFS | VFS |
| Name | Moms Soda Shop | Pops Soda Shop |
| Address | 222Hopmeadow Street | 5 Griffin Street |
| Street | | |
| PO Box/Rest | | |
| City | Simsbury | Bloomfield |
| State | Ct | Ct |
| Zip | 060990000 | 060444351 |
| Country | USA | USA |
| Phone | 2035555555 | 2036666666 |
| Cust ID | 5959595 | 464646 |
| Duns No. | 005959595 | 000464646 |
| Ult Duns | 000000000 | 000000000 |
| Ult Name | | |
| SIC Code | 5411 | 5411 |
| Exposure | 62775 | 102076 |

| 222 | | 5 | |
| Hopmeadow | St | Griffin | St |

Close_file | Read test pair | Match tester | Make train-test files | Apply rule to test file_opened | Search | | | ci/ira/gfks Match Scores | No pairs
Nummach | # Matches
Numnonmatch | # Non-matches 1
0.67
0.22
0.17
1
0.40
1
0.50
1.56
0.22
1.00
0.50
1.00

Soundex | Text3
Text1
Text2

50

GENERATING RULES FOR MATCHING NEW CUSTOMER RECORDS TO EXISTING CUSTOMER RECORDS IN A LARGE DATABASE

This application is a division of application Ser. No. 08/702,379, filed Aug. 23, 1996, which is hereby incorporated by reference in its entirety.

BACKGROUND OF THE INVENTION

The present invention relates generally to databases, and more particularly to matching new customer records to existing customer records in a large business database.

A large business database often has duplications of the same customer records. The duplications are likely due to misspelling errors or because of multiple methods of entering the customer records into the database. These duplications result in several problems for the end-user. One problem is that a customer whose records have been duplicated may receive multiple mailings from the end-user. Another problem is that the end-user may not ever have consistent information about each customer. The customer information may be inconsistent because every time the customer record has to be updated, only one record is updated. There is no assurance that the most recently updated record will be revised, which results in inconsistent information. A third problem with duplicated records, is that the end-user is unable to determine how much business activity has been generated by a particular customer. retrieval systems. These library-style catalogue retrieval systems can search a large database of records to find matches that are similar to a query entered by an end-user. Typically, these library-style catalogue retrieval systems use phonetic-based algorithms to determine the closeness of names or addresses or word strings. A problem with these library-style catalogue retrieval systems is that they are only useful for searching through an existing customer database and are unable to compress a large customer database having multiple repetitions of customer records. Therefore, there is a need for a methodology that processes new customer records, checks the new records for poor quality, normalizes and validates the new records, and matches the new records to existing customer records in order to determine uniqueness. Normalizing, validating, and matching the customer records will allow an end-user to avoid wasted mailings, maintain consistent information about each customer, and determine how much business activity has been generated by a particular customer.

SUMMARY OF THE INVENTION

Therefore, it is a primary objective of the present invention to provide a method and system that normalizes and validates new customer records, and matches the new records to existing customer records in a large database.

Another object of the present invention is to enable end-users of large business databases to avoid wasted mailings, maintain consistent information about each of their customers, and determine how much business activity has been generated by a particular customer.

Thus, in accordance with the present invention, there is provided a method and a system for matching a new data set containing a record and a collection of fields to an existing data set in a database containing a plurality of records each having a collection of fields. In this embodiment, the new data set is initially read. Each of the fields from the record in the new data set are then validated. The validated fields in the record in the new data set are then normalized into a standard form. Next, a hash key is selected for generating a candidate set of records from the existing data set in the database that likely matches the record from the new data set. The hash key is then applied to the plurality of records in the existing data set of the database to generate the candidate set of records. The record from the new data set is then matched to each of the records in the candidate set. The existing data set in the database is then updated according to the results of the match between the record from the new data set to the records in the candidate set.

In accordance with another embodiment of the present invention, there is provided a method and system for generating rules for matching data in a database containing a plurality of records each having a collection of fields. In this embodiment, a sample of training data is obtained from the database. Similar pairs of records from the sample of training data are then identified. Field matching functions are applied to each of the corresponding fields in the similar pairs of records. Each field matching function generates a score indicating the strength of the match between items in the field. An intermediate file of vectors containing matching scores for all of the fields from each of the similar pair of records is then generated. The intermediate file of vectors are then converted into a plurality of matching rules for matching data in the database. The plurality of matching rules can then be used for matching a new data set containing a record and a collection of fields to an existing data set in a database containing a plurality of records each having a collection fields.

While the present invention will hereinafter be described in connection with a preferred embodiment and method of use, it will be understood that it is not intended to limit the invention to this embodiment. Instead, it is intended to cover all alternatives, modifications and equivalents as may be included within the spirit and scope of the present invention as defined by the appended claims.

BRIEF DESCRIPTION OF THE DRAWINGS

FIG. 3 is an example of a fixed general business file format that may be used in the present invention;

FIG. 5 is a screen view of an interface used for the matching process; and

DETAILED DESCRIPTION OF THE PRESENT INVENTION

Figure 1:
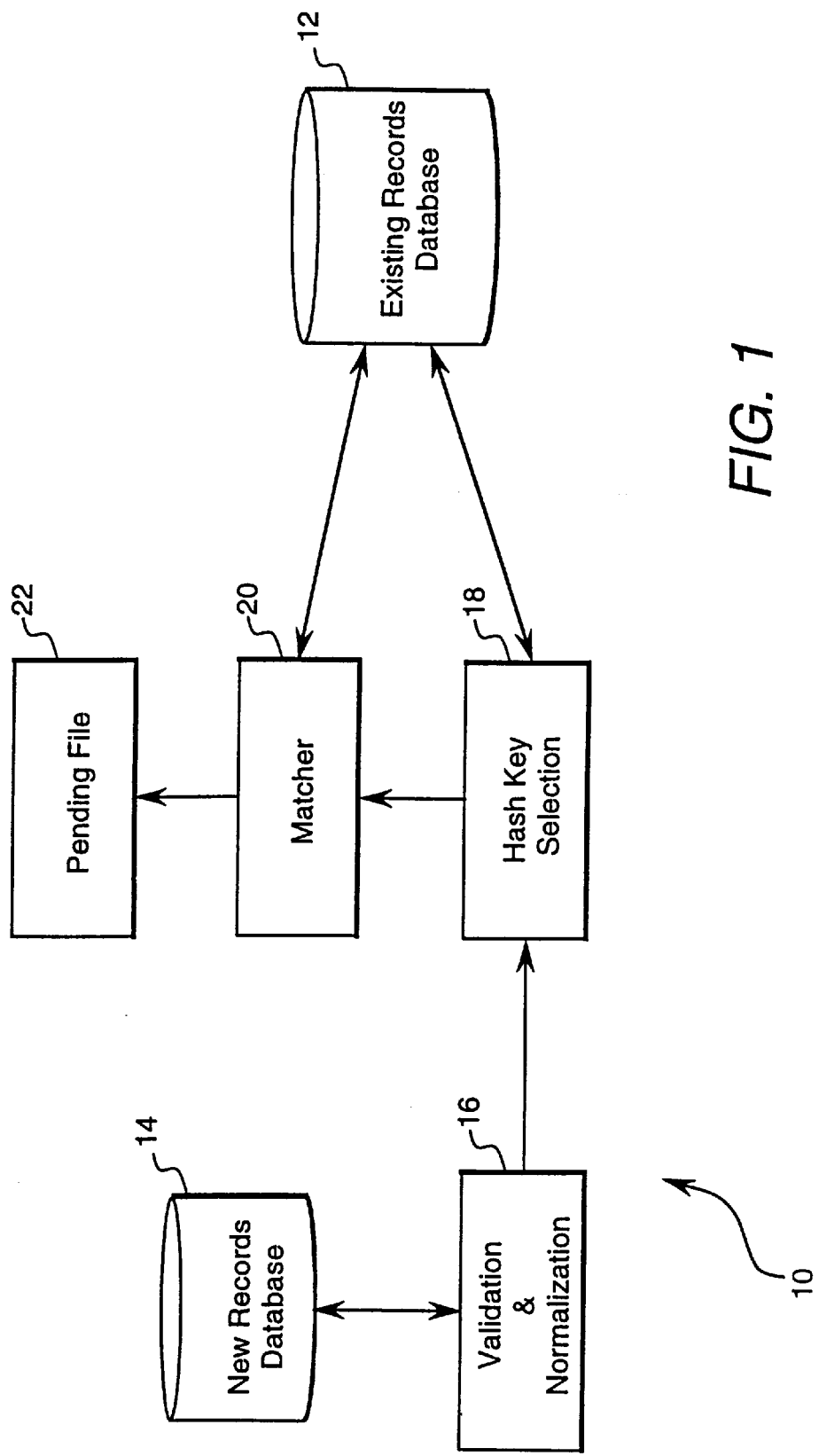
FIG. 1 is a block diagram of a system for data validation and matching according to the present invention.

The present invention discloses a data validation and matching tool for processing raw business data from large business databases. The raw business data includes a plurality of records each having a collection of fields and attributes. A block diagram of a system 10 for performing data validation and matching according to the present invention is shown in FIG. 1. The system 10 includes a database of existing customer records 12 and a database of new customer records 14. The database of existing customer records 12 can be a large database containing over 200,000 records. Each record has a collection of fields and attributes that are applicable for the particular business application. For example, some of the fields that may be used are business name, customer name, address, country, phone number, business codes, etc. The database of new customer records 14 can be as small as one record or as large as over 200,000 records. These records also have a collection of fields and attributes that are applicable to the business application.

The system 10 also includes a computer such as a workstation or a personal computer. A representation of the functions performed by the computer are shown as blocks 16, 18, 20, and 22. In particular, a validation and normalization block 16 reads the data from the new records database 14 and checks the fields in each record for quality and normalizes the field information into a standard form. If the data is good, then a hash key selector 18 selects a hash key. Note that there may be one or more hash keys. A matcher 20 uses the hash key to select a set of candidates from all of the existing records in the database 12 with the same hash key. For example, the present invention will generate about 100 candidates for a 50,000 record database. The matcher 20 performs a matching operation between a new data record from database 14 and each member of the candidate set. The matching operation, which is described below in further detail, creates a list of potential matches. If multiple hash keys are used, then the process will retrieve records based on a disjunction of the hash keys. However, once all the matching is done, the matcher 20 makes a decision whether to create a new customer record in database 12, update an existing record in database 12, or save the new data in a pending file 22 for resolution at a later time.

Figure 2:
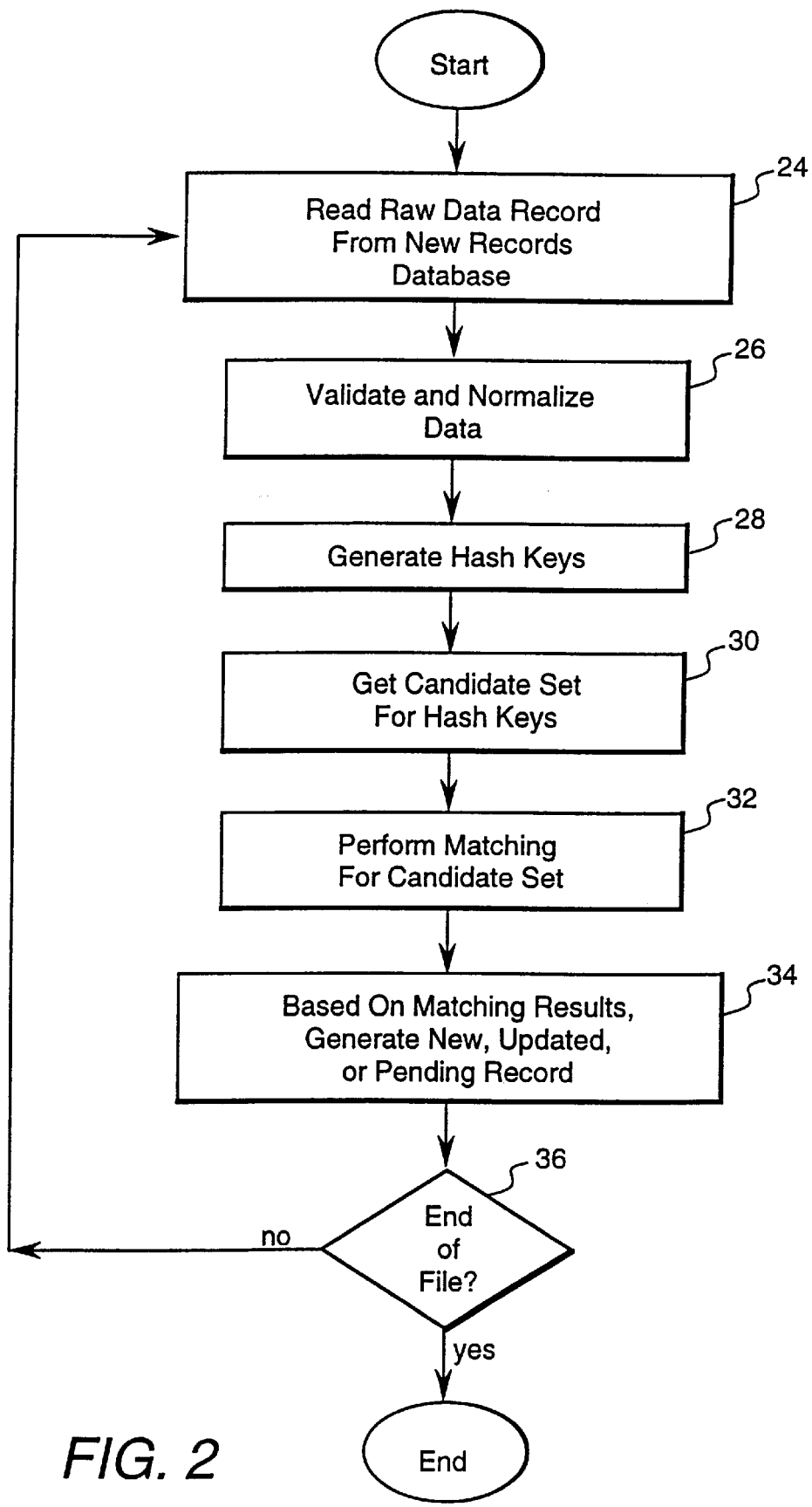
FIG. 2 is a flow chart describing the data validation and matching according to the present invention.

FIG. 2 is flow chart describing the operation of the data validation and matching according to the present invention. The operation begins by reading raw data from a record at 24. The data from the record is validated for quality and standardized into a standard form at 26. Hash keys are selected at 28 by the hash key selector 18. At 30, a set of candidates from all of the existing records in the database 12 with the same hash key are retrieved. The matching operation is then performed at 32 between the new data record and each member of the candidate set, resulting in a list of potential matches. Based on the matching results, block 34 creates either a new record in database 12, or updates an existing record in database 12, or places the new record in a pending file for resolution at a later time. If there are more records in the raw data file at 36, then the next record is read and the steps at 26, 28, 30, 32, and 34 are repeated. The operation ends once there are no more records to be processed.

Before validation and normalization, the raw data file from the new records is read. In the present invention, the data can arrive from many different hardware/software systems ranging from an off-the-shelf spreadsheet application to a mainframe dump that is in a fixed "General Business File" format. An example of a fixed general business file format 38 is shown in FIG. 3. The business file format includes a field number, field name, width of the field, and description of the field. Note that the business file format in FIG. 3 is only an example of possible fields and can change depending upon the particular business application. For instance, files of hospital patients may include patient name, date of birth, hospital ID, and patient sex.

After the raw data file has been read, each of the data fields in a record are examined to see if they can be validated. Data fields that contain internal codes are validated against a validation code table. The present invention can then download a SIC (Standard Industrial Classifications) table and a Zip Code table obtained from the United States Postal Office and check for validation. Other validation tables containing country codes and various abbreviations can be used as other validation tables. To speed up processing, all of the validation tables are loaded into memory at the beginning of the running of the data validation and matching system 10, with the exception of any zip code table which is generally too large. Then each of the fields from the record in the new data set are compared to the standards set forth in the validation tables and verified to make sure that the data corresponds to the standards listed in the validation table. In the present invention, the country code field is tested before the zip code field. From the zip code table it is possible to verify city and state. If there is only a city and state with no zip code, then the zip can be dubbed. The DUNS (a unique number assigned by Dun & Bradstreet Corp.) number can be validated using Dun & Bradstreet Corp. Modulus Ten Check Digit™ algorithm for the ninth digit. The data validation and matching system 10 also can check for clearly erroneous phone numbers (e.g., all 5's, or all 9's).

Once the data has been validated, the next step is to normalize the name and address. The idea behind normalizing the incoming data is to standardize names and addresses to facilitate matching without diluting the name or address. Standardization also enables better end-user name searches in the future. In the present invention, the normalization step removes excess punctuation such as periods and commas, leaving other punctuation from the name and address fields to avoid dilution. Abbreviations are handled in a different manner. For example, in some cases, an end-user types CORPORATION while someone else types CORP, or ST versus STREET. To avoid over-abbreviation and dilution the present invention uses a combination of abbreviations and expansions. In particular, the raw data is examined for the most common cases of alternative spellings. In addition, other items that are not part of the street address such as ATTN: ACCOUNTS PAYABLE are removed.

If the data in the fields are bad or unsuitable for normalization, then the record is removed from further consideration and placed in the pending file 22. The rules for determining bad or unsuitable data are very straightforward. In particular, if part of the country code and part of the postal code (zip code relates to U.S. addresses and postal code relates to international addresses) cannot be used as a hash key, then the data is bad and is placed into a "bad data" file for future resolution. The rules for insertion into the bad data file are as follows:

1) Lack of address—blank country—state—city—zip;
2) No way to determine country; and
3) In the U.S.: no zip code and cannot derive the zip code from city and state.

Rule 1 states that the data will be placed in the bad data file if it lacks an address such as country, state, city, and zip code. Rule 2 states that the data will be placed in the bad data file if there is no way to determine the country. Rule 3 states that the data will be placed in the bad data file if the country of the data is the U.S. and there is no zip code or the zip code cannot be derived from the city and state. Other bad data rules may be used for other business applications.

Once the customer record under consideration has been normalized, the next step is to determine if it matches any of the existing customers in the existing records database 12. However, given the size of the existing records database 12, it is too time consuming to perform a match of every record against the new customer records. Thus, a hash key is used to identify the set of existing customer records (i.e., the candidate set) against which the new record under consideration will be matched. The hash key is a field that is added to the customer files expressly for the purpose of identifying the candidate set. This field contains a concatenation of data in the other general business format fields. The specific composition of the hash key field is intended to maximize the likelihood that if the new customer record under consideration is in the database 12, then it will be found in the generated candidate set.

Although the illustrative embodiment of the present invention uses a single hash key, it is within the scope of the invention to utilize more than one hash key as part of the candidate set generation. Multiple hash keys increase the likelihood of correct classification by providing alternative paths for locating the matching record. These alternative paths can be used to locate the customer record in the database 12 if the record fields from which the primary hash key is computed contain invalid or missing data. However, the use of multiple hash keys increases implementation complexity and adversely impacts execution speed.

In the illustrative embodiment of the present invention, it is given that customer classification is based on a corporate entity located at a particular physical location. And it follows that the hash key used to identify the possible matches should generate the set of similar corporate entities located in a similar location. Thus, the hash key should be composed of attributes that describe the corporate entity and ones that describe its physical location. In general, when determining the combination of attributes to be used for the hash key it is important that the hash key be able to generate a list of likely matches (i.e., similar companies located in a similar location to the one being classified). Also, the hash key should be made up of fields containing the highest quality of data available. Data quality refers to the degree to which data is present and valid. Furthermore, the hash key should not generate candidate sets that are excessively large. This will impact subsequent matching speed. Another consideration is that the hash key should generate appropriate candidate sets for both domestic as well as international companies. Also, the hash key should not be overly lengthy, because it will impact the search speed of the database. Finally, the hash key should not be overly restrictive, because if the matching customer record is not included in the candidate set, then the match will not be made. Using the general business format provided in FIG. 3, the NAME field is the only Corporate Entity attribute that contains data of sufficient quality to warrant consideration for hash key inclusion. Of the Location attributes, the CITY, STATE, ZIP, and COUNTRY fields contain the highest quality data for consideration of a hash key.

Using the above considerations, one possible hash key function is:

SUBSTR(NAME,1,1 )+COUNTRY_CODE+SUBSTR(ZIP,1,3).

This hash key function is composed of the first letter of the NAME field, a two-character COUNTRY_CODE, and the first three characters of the ZIP CODE field. This hash key function works well because it is composed of high quality attributes, it produces relatively small candidate sets, and it is very compact. Another possible hash key function is:

SUBSTR(NAME,1,1)+COUNTRY_CODE+SUBSTR(CITY,1,7).

This hash key function is composed of the first letter of the NAME field, a two-character COUNTRY_CODE, and the first seven characters of the CITY field. This hash key function works well because it is composed of high quality attributes, it is composed of attributes that are particularly useful when dealing with international customer records, and it is very compact. When the two hash key functions are used in combination with each other, a broadened search strategy results. For example, one possible hash key that could be used is IUS281. This hash key has returned a candidate set of four records from the existing records database 12, which has over 200,000 records. This candidate set dramatically reduces the scope of the matching task.

After the candidate set has been retrieved, the matcher 20 determines if there is a match between the data of the new record set and records of the candidate set. In particular, the matcher 20 compares the data from the new record set to each of the records in the candidate set. Each comparison generates a matching score indicating a degree of match between the record from the new data set and each record in the candidate set. Depending upon the results of the matching, the matcher 20 makes a decision whether to create a new customer record in database 12, update an existing record in database 12, or to save the new data in the pending file 22 for resolution at a later time.

Figure 4:
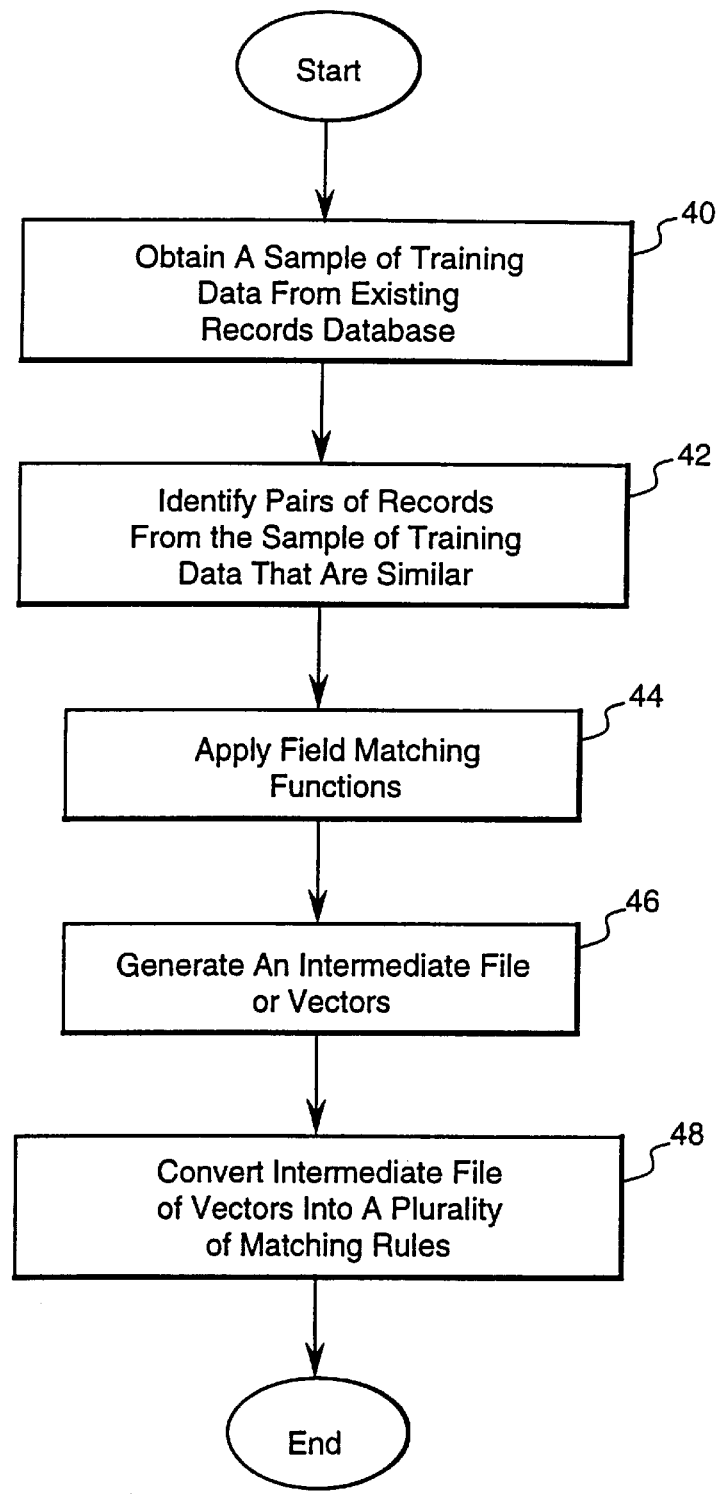
FIG. 4 is flow chart describing the matching process in more detail.

In order for the matcher 20 to determine if there is a match, it is necessary that the matcher learn a plurality of matching rules beforehand. FIG. 4 discloses a flow chart describing how the plurality of matching rules are learned in the present invention. The plurality of matching rules are learned by first obtaining a sample of training data from the existing records database 12 at 40. Next, pairs of records from the sample of training data that are similar are identified at 42. Field matching functions are then applied to each of the corresponding fields in the similar pairs of records at 44. Each field matching function generates a score indicating the strength of a match between items in the corresponding fields. Next, an intermediate file of vectors is generated at 46. The intermediate file of vectors contains matching scores for all of the fields from each of the similar pair of records. The intermediate file of vectors is then converted into a plurality of matching rules for matching the data in the databases at 48.

As mentioned above, the process of learning matching rules begins by examining similar pairs of records from the existing records database 12 and labeling the pairs of records as a "match" or "non match." This step is needed to learn automatically what attributes contribute to a match and what do not. The next step is to apply field matching functions to each of the corresponding fields in the similar pairs of records. In the illustrative embodiment, there are about a dozen main attributes of a customer record that are matched. Each attribute uses a field matching function to generate a score indicating the strength of the match. In particular, each field matching function takes two strings and computes a matching score from 0 for a non match to a 1 for a perfect match. In the present invention, there are three types of field matching functions. One type of field matching function is the exact match of strings between attributes. The exact field matching function is preferably used for the country and business attributes. Another type of field matching function is the phonetic-based match of attributes such as NAME and ADDRESS. The phonetic-based match may performed by using an off-the-shelf software application such as Soundex™, which matches phonetically similar names (e.g. Johnson, Johansen, Jonson, etc.) by compressing each input string, removing vowels, and comparing the compressed strings. Attributes such as the zip code, phone number, customer ID, Duns, Ultduns, and SIC are matched based on a character by character string comparison. In most cases, a field matching function is built in for each attribute. For example, for zip code matching, 5 character codes and 9 character codes were handled differently, and an extra weight was given to the 4th digit.

Sometimes extraneous elements or omissions in the address string offset the string, yielding inaccurate match scores. In order to obtain more accurate matches the present invention has adopted a strategy that exploits the inherent structure in an address by parsing the address into separate components and fitting them into certain templates. The basic templates are:

PO BOX—Number—Street name—Street descriptor—Direction;

PO BOX—Number—Direction—Street name—Street descriptor;

PO BOX—Number—Direction—Street name;

where any of the components in the templates could be missing. Note that the normalizing procedure standardizes the street descriptors, directions, and numbers prior to address matching. Following the parsing, the address field matching function generally proceeds as follows. The "PO BOX" is extracted first and then the input string is traversed to the end until the street descriptor is located. Next, the street number is searched until it is found. Then the direction element is checked and the street descriptor. All elements between the descriptor and the direction, or number are considered to be the street name.

Following the template fitting, each component is matched using the Soundex™ algorithm. Missing elements will degrade the final score. Any remaining elements that are not fitted to one of the above fields are considered a "rest," and a score is computed via a coverage match. The coverage match is the average of two values, the fraction of elements in the first address string that are in the second string and the fraction of second string elements that are in the first. All of these distinct matches are weighted to yield the final address match. The following example shows the performance of the field address matching function. In the example, the field matching function matches address 1 and address 2 which are:

Address 1 100 NW BIRK BARK RD PO BOX 22 11E

Address 1 STE 11E 100 BIRCH BARK RD PO BOX 22

The field matching function uses the template fitting to compare the address attributes. The template fitting is as follows:

| Template fitting: | | | Individual match |
|---|---|---|---|
| PO BOX: | 22 | 22 | soundex=1 |
| Street number: | 100 | 100 | soundex=1 |
| Street name: | BIRK BARK | BIRCH BARK | } |
| Street descriptor: | RD | RD | } soundex=.91 |
| Street direction: | NW | — | } |
| Rest: | 11E | STE 11E | coverage=.75 |

Using the aforementioned address rules, the actual address match score was 0.96.

The above field matching functions are then applied to the pairs of training data that were identified as similar to learn the plurality of matching rules. An example of the application of the field matching functions to the training data is shown in FIG. 5, which is a screen view 50 of the matching function. In FIG. 5, each record pair is displayed in the first two "white background" columns under the Record 1 and Record 2 headings and compared field by field, with the degree of match between fields listed under the match score heading. In this example, the business attribute (i.e., VFS), the country attribute (i.e., U.S.A.), and state attribute (i.e., CT) were an exact match. The name attribute had a matching score of 0.67 for MOMS SODA SHOP versus POPS SODA SHOP. The address attribute had a low matching score of 0.22 for 222 HOPEMEADOW STREET and 5 GRIFFIN ST. S. Other low matching scores occurred for the city attribute (SIMSBURY vs. BLOOMFIELD) and the Duns No. attribute. Relatively better matching scores occurred for the phone number and customer id attributes.

After all of the pairs of records have been evaluated, an intermediate file of vectors containing matching scores for all of the fields from each of the similar pair of records is generated. An example of an abbreviated intermediate file of vectors is shown below in Table 1.

TABLE 1

An Intermediate File of Vectors

| name | addr | city | state | zip | cou | phon | cid | duns | uldu | ulna | sic | match |
|---|---|---|---|---|---|---|---|---|---|---|---|---|
| 0.20 | 0.28 | 1.00 | 1.00 | 0.71 | 1.00 | 0.00 | 0.00 | 0.00 | 0.00 | 0.50 | 0.00 | 0 |
| 0.63 | 0.86 | 1.00 | 1.00 | 1.00 | 1.00 | 0.00 | 0.00 | 0.00 | 0.00 | 0.50 | 0.10 | 1 |
| 1.00 | 1.00 | 1.00 | 1.00 | 1.00 | 1.00 | 0.59 | 0.00 | 0.33 | 0.50 | 0.50 | 1.00 | 1 |
| 0.75 | 1.00 | 1.00 | 1.00 | 1.00 | 0.00 | 0.50 | 0.00 | 0.00 | 0.50 | 0.50 | 0.00 | 1 |
| 1.00 | 1.00 | 1.00 | 1.00 | 1.00 | 1.00 | 0.50 | 0.83 | 0.00 | 0.50 | 0.50 | 0.00 | 1 |
| 0.18 | 0.00 | 1.00 | 1.00 | 1.00 | 1.00 | 0.63 | 0.17 | 0.11 | 1.00 | 0.50 | 1.00 | 0 |

In each row there is a matching score between a pair of training records for each corresponding field. For example, in the first row, the matching scores between the name, address, city, state, zip code, country, phone, customer id, duns no., ult duns, ult name, and sic code fields are 0.20, 0.28, 1.00, 1.00, 0.71, 1.00, 0.00, 0.00, 0.00, 0.00, 0.50, and 0.00, respectively. The last column in the file designates whether the pair of records was a match (1) or a non-match (0).

The plurality of matching rules are then learned by converting the intermediate file of vectors into matching rules. Conversion of the intermediate file is achieved by using commercially available statistics applications. In the present invention, a decision tree induction algorithm called CART (Classification and Regression Trees) was used as part of an S-PLUS™ statistics package. These packages generate an output that is in the form set forth below, where a line with an asterisk indicates a rule.
1) root 1142 223.100 0.266200
   2) name<0.7 818 2.989 0.003667
      4) phone<0.905 810 0.000 0.000000*
      5) phone>0.905 8 1.875 0.375000*
   3) name>0.7 324 21.370 0.929000
      6) addr<0.625 23 0.000 0.000000*
      7) addr>0.625 301 0.000 1.000000*

In each row there is an inequality, then the number of training cases, then a distance measure, and last a frequency of match. For example, line (4) indicates that when the name field was <0.7 and the phone field was <0.905, then there were 810 cases, and 0 percent of them matched. Arbitrary thresholds near 0 and 1 are then used to decide when two records should be called a "match," a "non-match," or a "possible match," In the case of a "possible match," it is best if an end-user is consulted for advice. The above output is then parsed into matching rules to be used for subsequent matching The parsed rules for the above output are as follows:

If name match >0.7 and address match >0.625 then definite match
   If name match <0.7 and phone match >0.905 then maybe match—get expert approval.
otherwise no match.
Additional rules can be subsequently added, as necessary, to this learned rule set, based on the user's domain knowledge and data quality. An example of an added rule is if name=1 and address=1 and phone=1, then definite match.

The learned matching rules can then be used for matching a new data record from the new records database 14. Typically, a matching operation between a new customer data record and the candidate set will result in a list of zero to ten potential matches. If only one candidate is a definite match, then that record is considered to be the match for the new customer record. The existing customer database is then updated with data from the new customer record.

The existing customer record is updated by using the customer ID for the matched record. All fields of the existing record are then checked to see if the new record will provide additional information. If the existing record contains no information for a particular field and the new record contains information, then the new information is added. For addresses, information is added only if all existing address fields are blank or if the matching operation found new information like a PO Box where there was only a street address or vice verse. In any case, existing data is never changed.

If there are multiple "definite matches" or no "definite matches", but one or more "maybe matches", then those candidates are marked with a pending flag for entry into the pending file 22. These candidates are then resolved at a later time.

If there are no matches between the new customer record and the existing customer records, then a new customer entry is made in the customer table of the existing records database 12. Because the entry is a new record, a new unique customer ID has to be created for this particular customer record. The new customer database entry is then inserted with all available normalized data for this customer.

Figure 6:
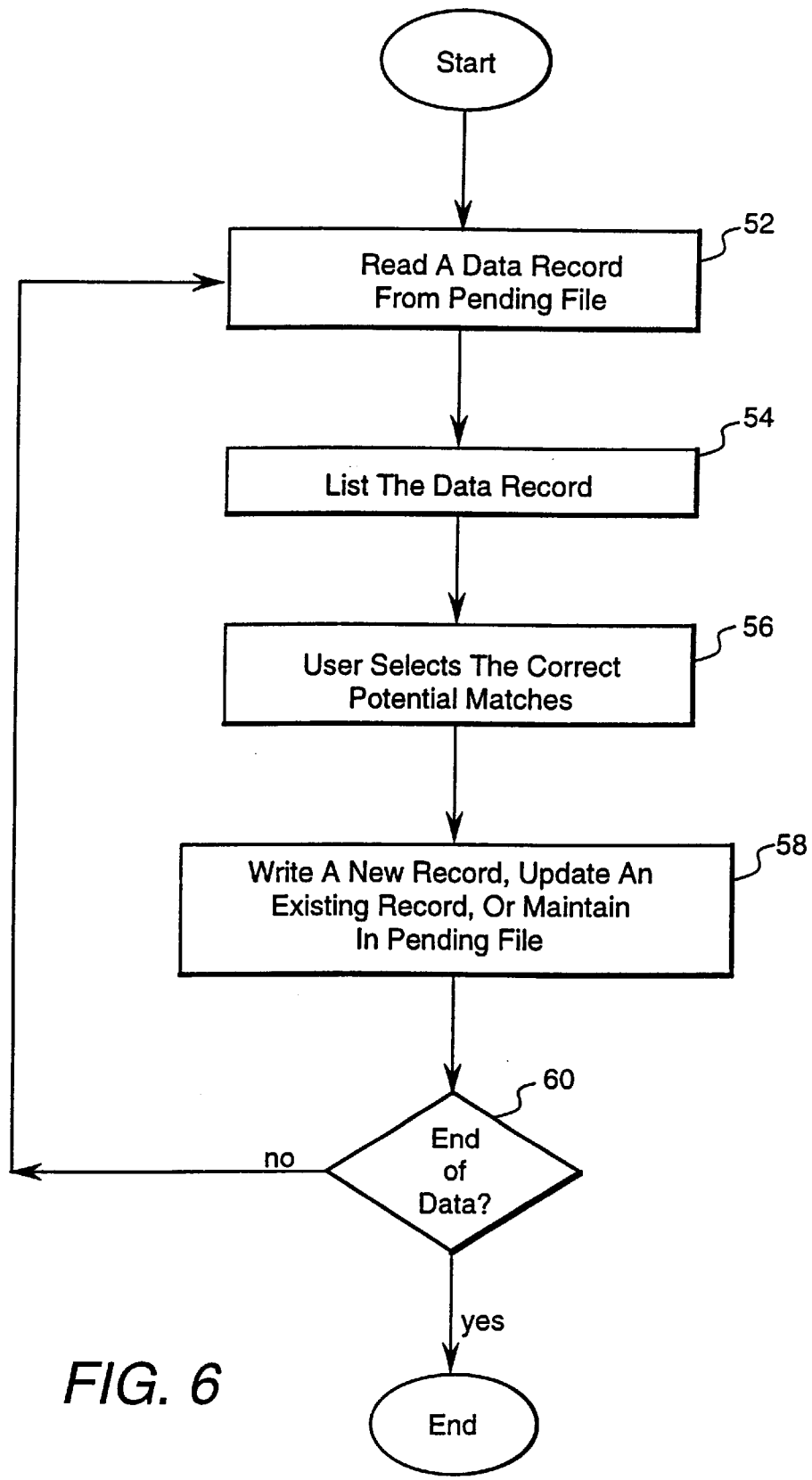
FIG. 6 discloses a flow chart describing the process of examining pending data for a match.

If the pending flag, described above, is true or there is no clear-cut winner among the list of potential matches, then the new customer data record does not go into the existing records database 12. The entire new data record is written out to the pending file 22, with those portions that have been normalized written to reflect the normalization. Also written is the list of customer IDs for the potential matches. This file can then be viewed later to determine which match, if any, is the correct match. FIG. 6 discloses a flow chart describing the process of examining pending data in the pending file for a match. The process begins by reading a data record from the pending file at 52. The data record is then listed at 54. Next, the correct potential customer record matches are selected by a user at 56. The data record can be presented to the user on the left side of the display, with data from each of the potential customer record matches on the right side. At 58, the user then decides what kind of matching should be done. For example, if the pending record is actually a new record, then the data is entered into a new record in the existing records database 12. If there is a match with one or more records, then the user can mark the records and can select which one will get the updated information. Another option is to keep the pending data record in the pending file 22. If there are more records as decided at 60, then steps 52, 54, 56, and 58 are repeated. Otherwise, the process ends if there are no more records.

It is therefore apparent that there has been provided in accordance with the present invention, a method and system for matching a new data set to an existing data set in a database that fully satisfy the aims and advantages and objectives hereinbefore set forth. The present invention has been described with reference to several embodiments, however, it will be appreciated that variations and modifications can be effected by a person of ordinary skill in the art without departing from the scope of the invention.

The invention claimed is:

1. A method for generating rules for matching data in a database containing a plurality of records each having a collection of fields, comprising the steps of:

obtaining a sample of training data from the database;

identifying pairs of records from the sample of training data that are similar;

applying field matching functions to each of the corresponding fields in the similar pairs of records, each field matching function generating a score indicating a strength of a match between items in the field;

generating an intermediate file of vectors containing matching scores for all of the fields from each of the similar pair of records; and converting the intermediate file of vectors into a plurality of matching rules for matching data in the database.

2. The method according to claim 1, wherein the field matching functions comprise exact matches, phonetic-based matches, and numeric string matches.

3. The method according to claim 1, wherein each vector comprises an overall matching score indicating whether each of the similar pair of records is a match or a non-match.

4. The method according to claim 1, wherein the plurality of matching rules indicate instances of matches, possible matches, and no matches.

5. The method according to claim 4, further comprising the step of using the plurality of matching rules for matching a new data set containing a record and a collection of fields to an existing data set in a database containing a plurality of records each having a collection fields.

6. A system for generating rules for matching data in a database containing a plurality of records each having a collection of fields, comprising:

means for obtaining a sample of training data from the database;

means for identifying pairs of records from the sample of training data that are similar;

means for applying field matching functions to each of the corresponding fields in the similar pairs of records, each field matching function generating a score indicating a strength of a match between items in the field;

means for generating an intermediate file of vectors containing matching scores for all of the fields from each of the similar pair of records; and means for converting the intermediate file of vectors into a plurality of matching rules for matching data in the database.

7. The system according to claim 6, wherein the field matching functions comprise exact matches, phonetic-based matches, and numeric string matches.

8. The system according to claim 6, wherein each vector comprises an overall matching score indicating whether each of the similar pair of records is a match or a non-match.

9. The system according to claim 6, wherein the plurality of matching rules indicate instances of matches, possible matches, and no matches.

10. The system according to claim 9, further comprising means for using the plurality of matching rules for matching a new data set containing a record and a collection of fields to an existing data set in a database containing a plurality of records each having a collection fields.

* * * * *

UNITED STATES PATENT AND TRADEMARK OFFICE
CERTIFICATE OF CORRECTION

PATENT NO. : 5,960,430

DATED : September 28, 1999

INVENTOR(S) : Haimowitz, et al

It is certified that error appears in the above-identified patent and that said Letters Patent is hereby corrected as shown below:

ON THE FACE OF THE PATENT :

(1) THE TITLE OF THE INVENTION SHOULD BE:

METHOD AND SYSTEM FOR GENERATING RULES FOR MATCHING DATA IN A LARGE DATABASE (2) PLEASE DELETE THE FOLLOWING INVENTORS:

BRIAN TERENCE MULLEN
HENRY LANDER
BARBARA ANN PIERCE
MARY CLARKESON PHILLIPS

LEAVING IRA JOSEPH HAIMOWITZ AS THE SOLE INVENTOR ON THIS PATENT

Signed and Sealed this

Twenty-second Day of May, 2001

*Attest:*

NICHOLAS P. GODICI

*Attesting Officer*      *Acting Director of the United States Patent and Trademark Office*